UNITED STATES PATENT OFFICE.

JOHN H. KELLOGG, OF BATTLE CREEK, MICHIGAN.

METHOD OF MANUFACTURING COFFEE SUBSTITUTES.

1,133,037.　　　　　Specification of Letters Patent.　　Patented Mar. 23, 1915.

No Drawing.　　　　Application filed May 12, 1913. Serial No. 767,099.

*To all whom it may concern:*

Be it known that I, JOHN H. KELLOGG, a citizen of the United States, a resident of the city of Battle Creek, of the county of Calhoun and State of Michigan, have invented certain new and useful Improvements in Methods of Manufacturing Coffee Substitutes, of which the following is a specification.

This invention is a new and novel method of manufacturing coffee substitutes.

Prior to my invention, so far as I am aware, it has been the custom to manufacture coffee substitutes for commercial use by producing a mixture of various cereals and roasting the mixture to produce the cereal coffe or coffee substitute. In roasting the mixture, portions thereof have become too greatly heated and burnt, while other portions have been incompletely roasted, whereby there has not been a uniform roasting of the mixture, and it has been practically impossible to produce a uniform product. The roasting of the mixture has also caused material loss of the product, as, under the high degree of temperature necessary in roasting, a large amount of volatile matter has vaporized or has passed off as smoke. Moreover, roasting requires considerable time and materially lengthens the process necessary to produce a commercial product.

The object of the present invention is to avoid all of the aforementioned objections, and in particular to eliminate the roasting step, and also to provide a coffee substitute of uniform quality. In this connection, it is proposed to caramelize the sugar and convert the starch and other ingredients into desired flavors and aromatic substances in a very simple, inexpensive and efficient manner.

By the practice of this method, there is produced a coffee substitute composed entirely of soluble matter which may be marketed in powdered or granulated form, compressed into tablets, or coated upon an insoluble vehicle or carrier.

In carrying out the invention, I take one or more of the substances from which a coffee substitute can be made, such as, for instance, the following cereals or substances: wheat, rye, corn, bran, sugar, molases, bananas, figs, and, in fact, any starchy or sugar-containing substances, and in addition thereto any suitable substances which may be considered desirable for producing an agreeable flavor and for giving the product a nutrient or therapeutic value. It will, of course, be understood that I may use any one of the aforementioned substances, or may make any desired selection therefrom and produce a mixture thereof. When starch is present in the mixture, it may be in its raw state, or it may be partly or completely digested by diastase. After producing any desired mixture of the materials, water is added in a sufficient quantity to produce a mass of semi-liquid or gruel-like consistency, and this mass is cooked, preferably by placing the mass in a closed vessel or retort and subjecting it to a temperature sufficiently high to caramelize the sugar and convert the starch and other ingredients into desired flavors and aromatic substances. This temperature can, of course, be produced in a number of ways, as for example the retort or closed vessel may be provided with a steam jacket and the steam supplied from a suitable source, or the closed vessel or retort may be placed in a bath of oil or of calcium chlorid of sufficient specific gravity to sustain the required temperature without volatilization. I have found, by experiment, that satisfactory results may be obtained with a temperature of about 300° Fahrenheit, or that produced by a steam pressure of approximately seventy pounds. However, the temperature should not be less than 250° Fahrenheit. The mixture is exposed to this heat for a period of approximately two hours, although by controlling the temperature, this period may be increased or diminished. By increasing the temperature, the period may be shortened, and by decreasing the temperature, the period may be lengthened. I find it preferable to employ a vessel of porcelain or earthenware or a porcelain-lined vessel or retort, as the acids produced during this treatment of the mixture may, in some degree, attack the baser metals. After completing the cooking step, I next separate the soluble matter out of the cooked mass by mixing with it a larger quantity of water and filtering out the insoluble residue. The same result may be obtained by subjecting the cooked mass to high pressure and squeezing out the liquid, a hydrostatic press forming a very convenient means for this purpose. The liquid filtrate, or the liquid squeezed out of the mass by pressure, depending upon which method of separation is employed, is concentrated by suitable means, a vacuum pan preferably being employed. The product thus obtained is ready for the market, and may be ground to a powder, granulated, or pressed into tablet form, or it may be applied in the form of a coating upon some insoluble vehicle or carrier.

The coffee substitute thus produced will be found to be soluble in either hot or cold water. The table beverage is preferably prepared by adding hot water to the product, in which it will immediately dissolve.

From the foregoing explanation of my invention, it will be apparent that a coffee substitute made in accordance with my method will retain the full strength of the material or materials from which the coffee substitute is made, as none of the soluble or volatile matter has had opportunity to vaporize as in the ordinary roasting process. It will further be apparent that the coffee substitute produced will be of uniform grade and quality, no opportunity having been given to burn the product or unevenly heat it.

In proceeding in accordance with my method, the sugars of the sugar-containing materials are caramelized, while the starch, dextrin, tannins and various plant extractives are converted and thus various flavors and aromatic substances are formed. The development of these substances is particularly favored by my method, namely, heating in a moist state under pressure, since the presence of water under these conditions makes possible the chemical changes referred to at a comparatively low temperature, and burning and uneven or non-uniform caramelization and conversion are effectually prevented.

When proceeding according to prior methods, that is to say, by roasting the material in a dry state, a much higher temperature is required, and the desirable chemical changes are only imperfectly developed, while undesirable chemical changes occur, such as burning and the production of empyreumatic oils, pyroligneous acid, etc., which give to the produce an undesirable flavor and injurious properties.

An important effect of cooking the wet mass is to render soluble a large amount of material which is not soluble in a raw state. While sugar is, of course, soluble in a raw state, starch is insoluble, and consequently the present process renders the starch soluble. Other substances contained in the mixture, which are only slightly soluble, or, not at all soluble, are made soluble by the chemical changes produced by the process.

It will, of course, be obvious that various modifications of the method herein disclosed may be made, within the scope of the claims, without departing from the spirit or sacrificing any of the advantages of the invention.

Having thus described the invention, what is claimed, is:—

1. The method of producing a coffee substitute, which consists in treating a sugar-containing substance or substances to caramelize the sugar, and maintaining the substance or substances in a condition which will prevent roasting thereof during the caramelization of the sugar.

2. The method of making a coffee substitute, which consists in treating a sugar-containing substance or substances in a wet condition to caramelize the sugar thereof.

3. The method of making a coffee substitute which consists in wetting a substance or substances containing sugar, caramelizing the sugar, and maintaining the substance or substances in a wet condition during the caramelization of the sugar.

4. The method of making a coffee substitute, which consists in forming a wet mixture including sugar-containing substances, heating the mixture to caramelizing temperature, and maintaining the mixture in a wet condition during the caramelization of the sugar.

5. The method of making a coffee substitute, which consists in forming a mixture including sugar-containing materials, adding water thereto, cooking under pressure at caramelizing temperature, and removing the insoluble matter.

6. The method of making a coffee substitute, which consists in forming a mixture including sugar-containing materials, adding water thereto, cooking under pressure at caramelizing temperature, separating out the soluble matter, and drying said soluble matter.

7. The method of making a coffee substitute, which consists in adding water to a mixture including sugar-containing materials in sufficient quantity to produce a mass having a semi-liquid or gruel-like consistency, cooking the same under pressure at caramelizing temperature, separating out the soluble matter, and concentrating the same.

8. The method of making a coffee substitute, which consists in adding water to a mixture including sugar-containing materials, cooking the same in the presence of water at a temperature of approximately 300° Fahrenheit, separating out the soluble matter from said mixture, and concentrating the same.

9. The method of making a coffee substitute, which consists in adding water to a mixture including sugar containing materials, cooking the same at caramelizing temperature under pressure of approximately seventy pounds, separating out the soluble matter, and concentrating the same.

10. The method of making a coffee substitute, which consists in adding water to a mixture including sugar-containing materials, cooking the same at a temperature of approximately 300° Fahrenheit under pressure for a period of approximately two hours, separating out the soluble matter from the cooked mixture, and concentrating the soluble matter.

11. The method of making a coffee substitute, which consists in adding water to a mixture including sugar-containing materials, cooking the same under pressure to caramelize the sugar, adding additional water to the cooked mixture, filtering out the soluble matter, and concentrating the said soluble matter.

12. The method of making a coffee substitute, which consists in adding water to a mixture of starch and sugar-containing materials, subjecting the same in the presence of water to a sufficiently high temperature to caramelize the sugar and convert the starch, separating out the soluble matter, and concentrating said soluble matter.

13. The method of making a coffee substitute, which consists in adding water to a mixture including sugar-containing materials, and cooking the wet mixture at caramelizing temperature.

14. The method of making a coffee substitute, which consists in adding water to a mixture including sugar-containing materials, and cooking the wet mixture thus produced at caramelizing temperature in a closed vessel.

15. The method of making a coffee substitute, which consists in forming a mixture of starchy and sugar-containing substances, subjecting the mixture to heat of a degree to caramelize the sugar and convert the starch, and maintaining the mixture in a condition to prevent roasting thereof.

16. The method of making a coffee substitute, which consists in forming a mixture of plant substances and sugar-containing substances, subjecting the mixture to heat of a degree to caramelize the sugar and convert the plant extractives to give aroma and flavor to the product, and maintaining the mixture in a condition to prevent roasting thereof.

JOHN H. KELLOGG.

Witnesses:
R. P. DE VAULT,
PHOEBIE R. MCCAULEY.